United States Patent
Dudley

(10) Patent No.: US 7,962,751 B2
(45) Date of Patent: Jun. 14, 2011

(54) METHOD FOR PORTABILITY OF INFORMATION BETWEEN MULTIPLE SERVERS

(76) Inventor: Arthur Frederick Dudley, Detroit, MI (US)

(*) Notice: Subject to any disclaimer, the term of this patent is extended or adjusted under 35 U.S.C. 154(b) by 698 days.

(21) Appl. No.: 12/037,532

(22) Filed: Feb. 26, 2008

(65) Prior Publication Data

US 2008/0209527 A1    Aug. 28, 2008

Related U.S. Application Data

(60) Provisional application No. 60/903,416, filed on Feb. 26, 2007.

(51) Int. Cl.
  *H04L 9/32* (2006.01)
  *G06F 7/04* (2006.01)
  *G06F 17/00* (2006.01)
(52) U.S. Cl. .................. 713/176; 726/30; 463/1
(58) Field of Classification Search .................. 713/176; 726/30; 463/1
  See application file for complete search history.

(56) References Cited

U.S. PATENT DOCUMENTS

| | | | |
|---|---|---|---|
| 6,015,348 A | 1/2000 | Lambright et al. | |
| 6,050,898 A | 4/2000 | Vange et al. | |
| 6,659,861 B1 | 12/2003 | Faris et al. | |
| 6,767,287 B1 | 7/2004 | Mcquaid et al. | |
| 6,817,947 B2 | 11/2004 | Tanskanen | |
| 6,884,172 B1 | 4/2005 | Lloyd et al. | |
| 6,921,337 B1 | 7/2005 | Kennedy et al. | |
| 6,941,344 B2 | 9/2005 | Prell et al. | |
| 7,347,781 B2 | 3/2008 | Schultz | |
| 2005/0038753 A1* | 2/2005 | Yen et al. | 705/59 |
| 2006/0223600 A1* | 10/2006 | Wisdom et al. | 463/1 |

* cited by examiner

*Primary Examiner* — Jacob Lipman
(74) *Attorney, Agent, or Firm* — Butzel Long

(57) ABSTRACT

A method for verifying the authenticity of content created by one host for verification and portability to other hosts includes the steps of creating a data set containing data objects, establishing an authentication code system, authorizing the first host to modify the data set; establishing a valid authentication code for the first host in accordance with the authentication code system, modifying the data set by the first host, signing the data set using the authentication code for the first host, transferring the data set to a second host, determining whether the data set was modified by a host having authority to modify the data set by verifying the authentication code used to sign the data set, and then allowing transfer to and use of the modified data set by the second host so long as the data set was modified by a host having a valid authentication code.

11 Claims, 4 Drawing Sheets

METHOD FOR PORTABILITY OF INFORMATION BETWEEN MULTIPLE SERVERS

CROSS-REFERENCE TO RELATED PATENT APPLICATIONS

This application claims the benefit of, and priority to, U.S. Provisional Patent Application No. 60/903,416, filed Feb. 26, 2007, which is incorporated by reference herein.

BACKGROUND OF THE INVENTION

The present invention relates generally to the portability of electronic data and, more particularly, to a system and method for the authentication of data transferred between multiple computer servers.

Soon after the advent of the computer was the advent of the computer game. The first computer games were simple, single-player games. As it became common to network two or more computers, a genre of multi-player computer games evolved, allowing multiple individuals to play against each other from individual but networked computers. The increase in popularity of the Internet has provided a perfect medium for multi-player games to prosper in the past few years. Some of these games, called massively multi-player online games (MMOGs), are capable of supporting hundreds, if not thousands, of players simultaneously. These MMOGs allow players to compete with and against a vast number of other players in a persistent online world.

These online "worlds" are typically hosted by a single, unique host server, which is usually owned and operated by the inventor/owner/exclusive licensee of the game. Players then pay a fee—most often on a monthly or bimonthly basis—in order to participate in the game. This leads to one of the main weaknesses facing these games today—hackers. Hackers have been able to break into the host servers and essentially steal the host side of the MMOG. The hacker can then create a "pirate" host server. Through this pirate host server, the hacker can allow participants to play the game for free or charge a fee and profit. Either way, the person who owns the game and the original server has been cheated. In the past, when the owner of the legitimate host server has tried to shut down a pirate server, they have not been successful due to large part to the software being copyrighted and not patented. As a result, the pirates often prevail by alleging reverse engineering of the software and not illegal copying.

Some of the most popular MMOGs are role-playing games (MMORPGs), in which the players assume the role of a fictional character and take control over that character's actions. During the course of the game, players build up character features such as strength, intelligence, wealth, and other characteristics desirable for the particular game. Players can also acquire weapons, magic potions, money and other items which can be used by a player's character. Competition on these MMORPGs has become very intense with players investing large amounts of time in order to develop their characters.

This leads to the other main weakness facing these types of games—cheating. Some players have developed bots, or automated programs, that assist in accumulating characteristics by playing the illegal or fake instance of the game automatically, continuously and indefinitely. The cheaters join a game, create characters and then have their programs play the game to build up the characters and acquire objects. Once they have a built up character, they can take over and play the artificially enhanced character themselves or they can sell the character off line for real world money. These built up characters are then taken to the "real" version of the game and used to play the game without having to spend the time and other real-world resources it would have taken to attain that character. This cheats not only the operator of the game server but also other players that have spent considerable resources to build up their own characters.

There is a need in the art for a system that solves the above problems and allows for the creation of a free market for virtual items with protections similar to those which people experience with real world items, which is an object of the present invention. There is a need for a system that allows for multiple online host servers. Having a scheme which accommodates multiple legitimate host servers would limit the ability of pirates to steal the host server software and use it for profit. Therefore, it is another object of the present invention to guarantee that transactions, or the portability of data, between multiple hosts are valid and for those validated transactions to exist among multiple trusted hosts.

SUMMARY OF THE INVENTION

The present invention concerns a method of verifying the authenticity of content created by one host for verification and portability to other hosts. The method of the present invention includes the steps of creating a data set containing data objects, establishing an authentication code system, authorizing the first host to modify the data set; establishing a valid authentication code for the first host in accordance with the authentication code system, modifying the data set by the first host, signing the data set using the authentication code for the first host, transferring the data set to a second host, determining whether the data set was modified by a host having authority to modify the data set by verifying the authentication code used to sign the data set, and then allowing transfer to and use of the modified data set by the second host so long as the data set was modified by a host having a valid authentication code.

In another embodiment of the present invention, a method is disclosed for differentiating between authorized and unauthorized modifications made by a host to a data set containing data objects, comprising the steps of authorizing a host to modify certain data objects of the data set, modifying data objects of the data set, determining whether modifications to the data set were authorized, accepting modifications to the data object of the data set that were authorized, and denying modifications to the data object of the data set that were unauthorized.

In the online game scenario, one exemplary implementation of the present invention involves the transfer of game character data across multiple host servers all running the same application, or game. In an alternate embodiment of the present invention, the data is allowed to be verified and transferred amongst multiple host servers for use in different applications such as a different game or a non-game application.

DESCRIPTION OF THE DRAWINGS

The above, as well as other, advantages of the present invention will become readily apparent to those skilled in the art from the following detailed description of a preferred embodiment when considered in the light of the accompanying drawings in which.

DESCRIPTION OF THE PREFERRED EMBODIMENT

The present invention discloses a system, or method, that enables the verification of user created content such that the content may be transferred among multiple hosts without unauthorized modifications. While this authentication method is described as being used in conjunction with online role-playing games, one skilled in the art will appreciate that it can be employed in many different non-game scenarios in which it is desirable to move content between multiple servers and authenticate the same. A brief description of the preferred embodiment of the method follows.

Figure 1:
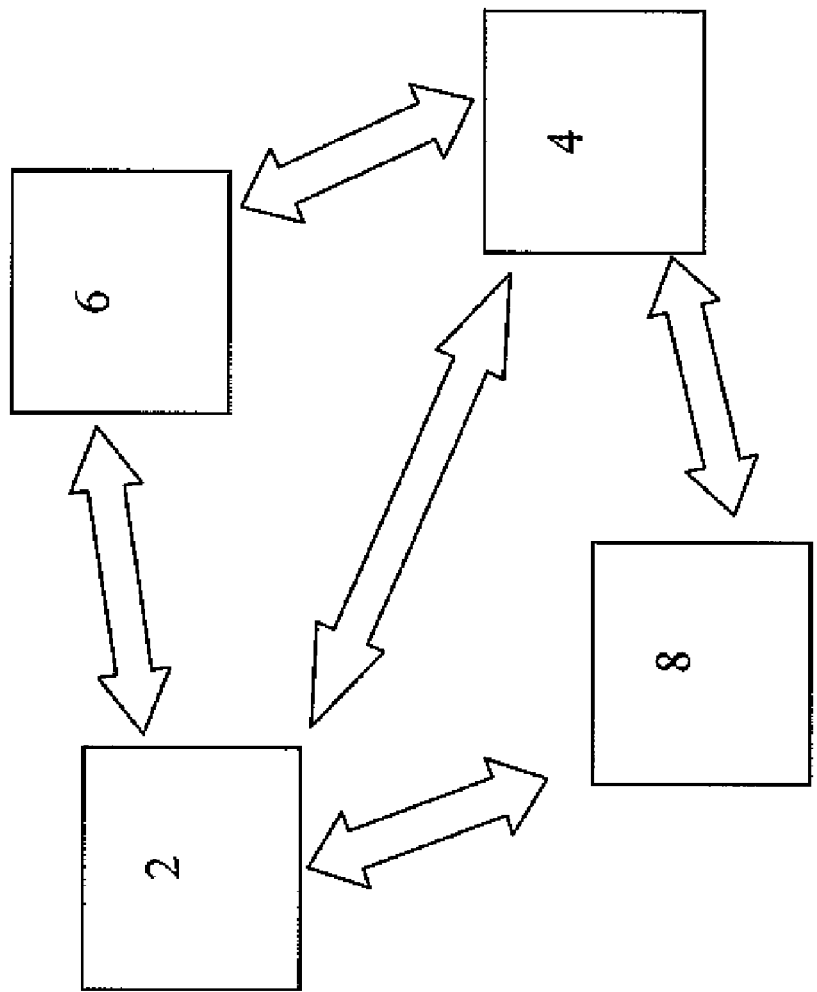
FIG. 1 is a schematic of a networked environment in accordance with the present invention.

Referring to FIG. 1, the present invention is intended to be used in a networked environment, whether a local network or a wide area network including the Internet or a combination thereof. The invention preferably involves at least a first party server 2, a second party user computer 4, and a third party host server 6. For exemplary purposes, FIG. 1 further includes an unauthorized host server 8. For simplicity, only one user computer 4 and one host server 6 are shown in the Figure and described herein but one skilled in the art will appreciate that the current method also applies when there are multiple users and multiple host servers. Each of the first party server 2, the second party user 4, and the host server 6 are preferably capable of being in communication. When there are multiple second party user computers 4 it is not necessary for each of the user computers to be in communication with each other.

In order to prevent the transfer of data that was modified without authorization when moving data from one host to another, the method of the present invention addresses four main data transfer scenarios. The first scenario is the movement of data from one authorized host maintained by a first party to another authorized host maintained by a second party. The second scenario is the movement of data from one authorized host to an unauthorized host. The third scenario is the movement of data from an unauthorized host to an authorized host and the fourth scenario is the movement of data that has been modified by both an authorized host and an unauthorized host. The method of the present invention and how it applies to each of the above scenarios to ensure that only authorized modifications to the data are allowed to be transferred to authorized servers is described in more detail hereinbelow. These scenarios and the following disclosure, however, are for exemplary purposes and not intended to limit the scope of the other scenarios capable of being addressed by the method disclosed herein.

Again, for purposes of illustration, the application of the present invention to an Internet game scenario such as an MMOG is described but such application is not intended to limit the scope of the present invention. One skilled in the art will appreciate that the present invention will apply as well to virtually any application that requires the portability of data between various servers and the need for authentication of the same.

Figure 2:
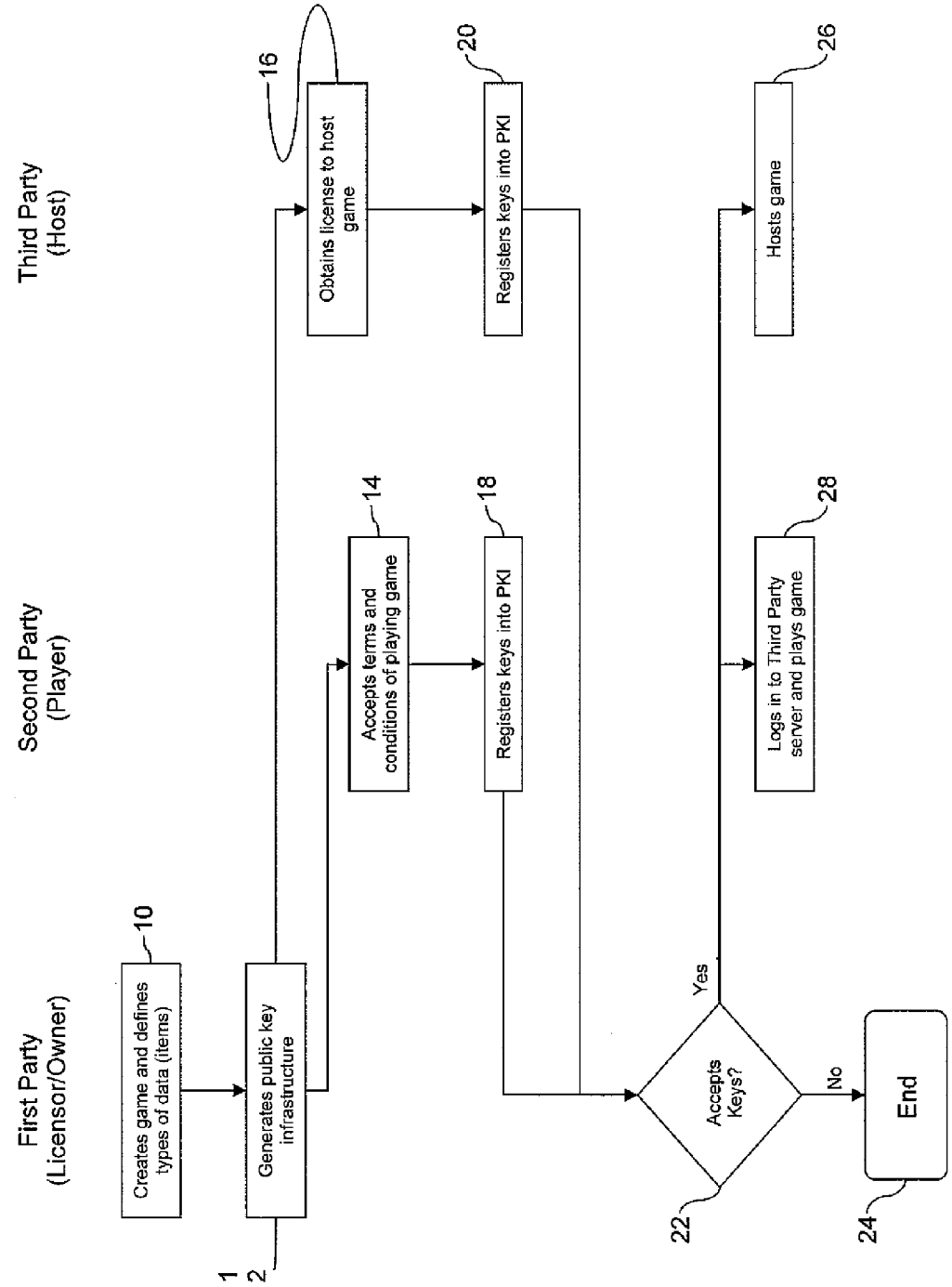
FIG. 2 is a schematic showing the initial steps for data portability in accordance with the preferred embodiment of the present invention.

Referring now to FIG. 2, the initial steps for data portability in accordance with the preferred embodiment of the present invention are shown. The initial steps as shown in FIG. 2 involve the First Party creating the game, determining the types of data objects for the game, and establishing an authentication code system used to verify the validity of data modification. Such a system may be an encryption scheme utilizing a public key infrastructure (PKI), but any other type of authentication system known in the art may be utilized. The process of setting up the encryption scheme and the PKI are not described in detail herein as encryption schemes and their use are well-known to a person skilled in the art. As shown in FIG. 2, as the first step 10, the First Party (typically the owner and/or licensor of the game) creates the game and defines the data objects that create a data set for the game. It are these data objects and hence their corresponding data sets that will be modified during the course of the game. This step also involves the First Party defining a valid file format for each of the data objects of the game. The First Party need not enumerate all of the possible valid permutations of data combinations. It must simply create a set of rules for determining if a particular combination is valid. In order to implement the preferred embodiment of the present invention, the First Party also creates formal rules for game play which permits the creation of valid, verified data objects by Second Parties (game players playing the game) and Third Parties (authorized game hosts).

Then, in step 12, the First Party creates a PKI that is preferably both secure enough and robust enough to support the transactions that the First Party wants to authorize. If the First Party wishes to host a game itself, it must also create a pair of public and private keys for itself. The PKI is used to verify the relationship between the Second Parties and Third Parties with the First Party. As will be well known by one skilled in the art, this process of the First Party creating a PKI a process for registering public and private keys created by the Second Party and the Third Party, respectively.

Then, in step 14, the Second Party (the player/user) accepts the terms and conditions of the game as established by the First Party. This process may include any number of steps as determined by the First Party, including paying a fee to the First Party for playing the game. The Third Party may also require any number of steps including additional payment in order to use their hosted instance of the game. As shown in step 16, in order to be a valid host of the game, the Third Party obtains authorization from the First Party to do so. Such authorization may be via an agreement with the First Party, such as a license. Once authorization is obtained the Third Party is able to create a pair of public and private keys in accordance with the PKI established by the First Party. Depending on the First Party's preference, if a Third Party is hosting multiple instances of a game, it may be required to create keys for each instance or it may simply create one set of keys to identify the Third Party. As then shown in steps 18 and 20 of FIG. 2, both the Second Party and the Third Party register their public keys with the PKI in accordance with a typical public/private key encryption scheme as is well known in the art. Despite being explained simultaneously herein, steps 18 and 20 do not need to occur simultaneously. The registration process also includes the First Party determining whether the public key of each of the Second Party and the Third Party conforms to the standards established by the First Party and either accepts or denies each key, as shown in step 22.

If the First Party does not accept a public key submitted for registration by the Second Party or the Third Party, the process preferably ends at step 24 but the Party may be given another opportunity to submit a compliant key. If the First Party accepts the public key submitted for registration by the Third Party, it can proceed to host the game in step 26. Similarly, in step 28, if the First Party accepts the public key submitted for registration by the Second Party, it can log in to the First or Third Party's server and proceed to play the game.

Figure 3:
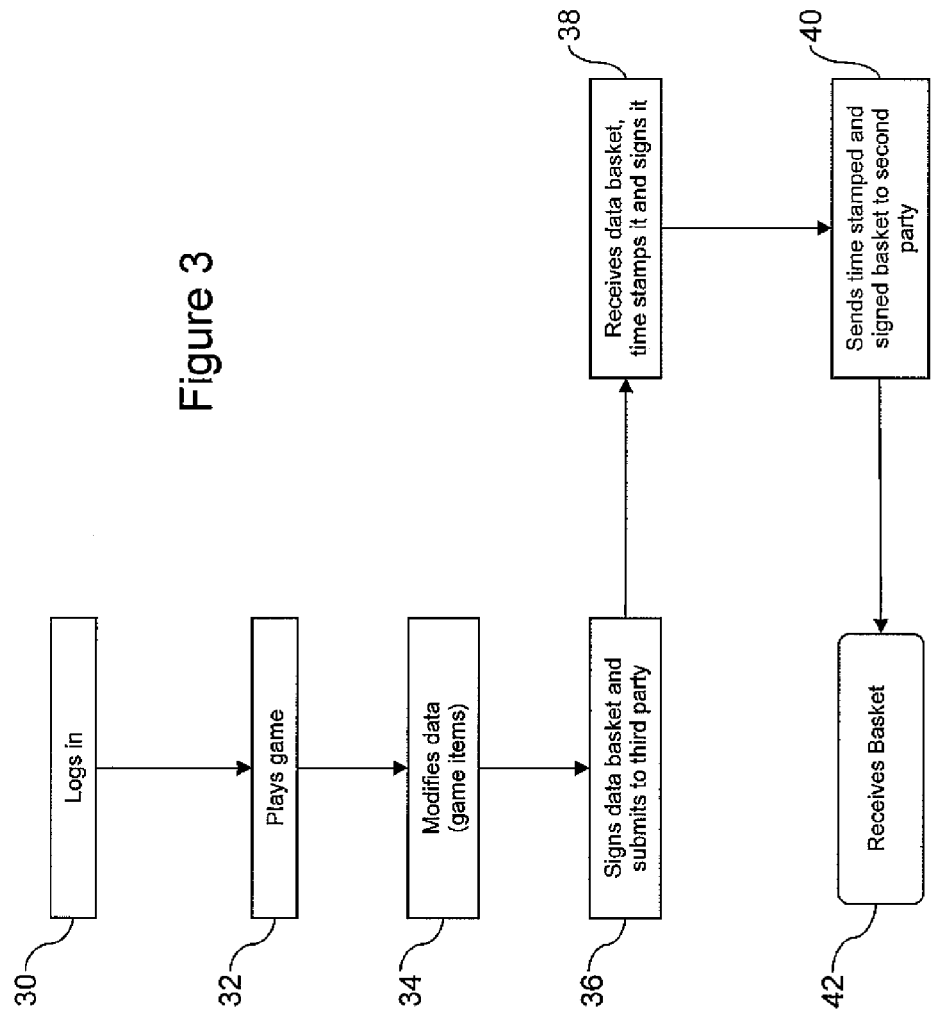
FIG. 3 is a schematic showing the process in which the Second Party creates or modifies a set of data items by playing an authorized game instance hosted by the Third Party in accordance with the preferred embodiment of the present invention.

Referring now to FIG. 3, the process in which the Second Party, a player, creates or modifies a "basket," which is simply a data set for the game items, by playing an authorized game instance hosted by the Third Party is outlined. As shown in step 30, the Second Party logs into the game instance hosted by the Third Party in accordance with the requirements established by the First Party and/or the Third Party. Then, in 32 the Second Party plays the game and acquires game items, such as characters and character enhancements, such as weapons. In step 34, the game items are modified through game play. For example, the character(s) can acquire strength, wisdom or other personal characteristics through actions taken in the virtual environment. The types of information listed here are exemplary only and not meant to limit the scope of this disclosure. The data set representing these game items are stored in the "basket" for ease of reference. In step 36, when the Second Party has completed a game session and wishes to exit the game instance, the Second Party signs the basket of game items and submits it to the Third Party. Then, in step 38, the Third Party time stamps and signs the basket of game items. The time stamp allows the PKI to verify that, at the time the objects were modified, both the Second Party and the Third Party were authorized participants in the First Party's game environment. The Third Party then sends the time stamped and signed basket of game items back to the Second Party at 40. Finally, in step 42, the Second Party receives the basket containing the Third Party time stamp and the signatures of the Second Party and the Third Party and exits the game. These details of this process are simply a preferred embodiment and preferred method of validating the data set and may be modified without straying from the overall scope of this disclosure.

Figure 4:
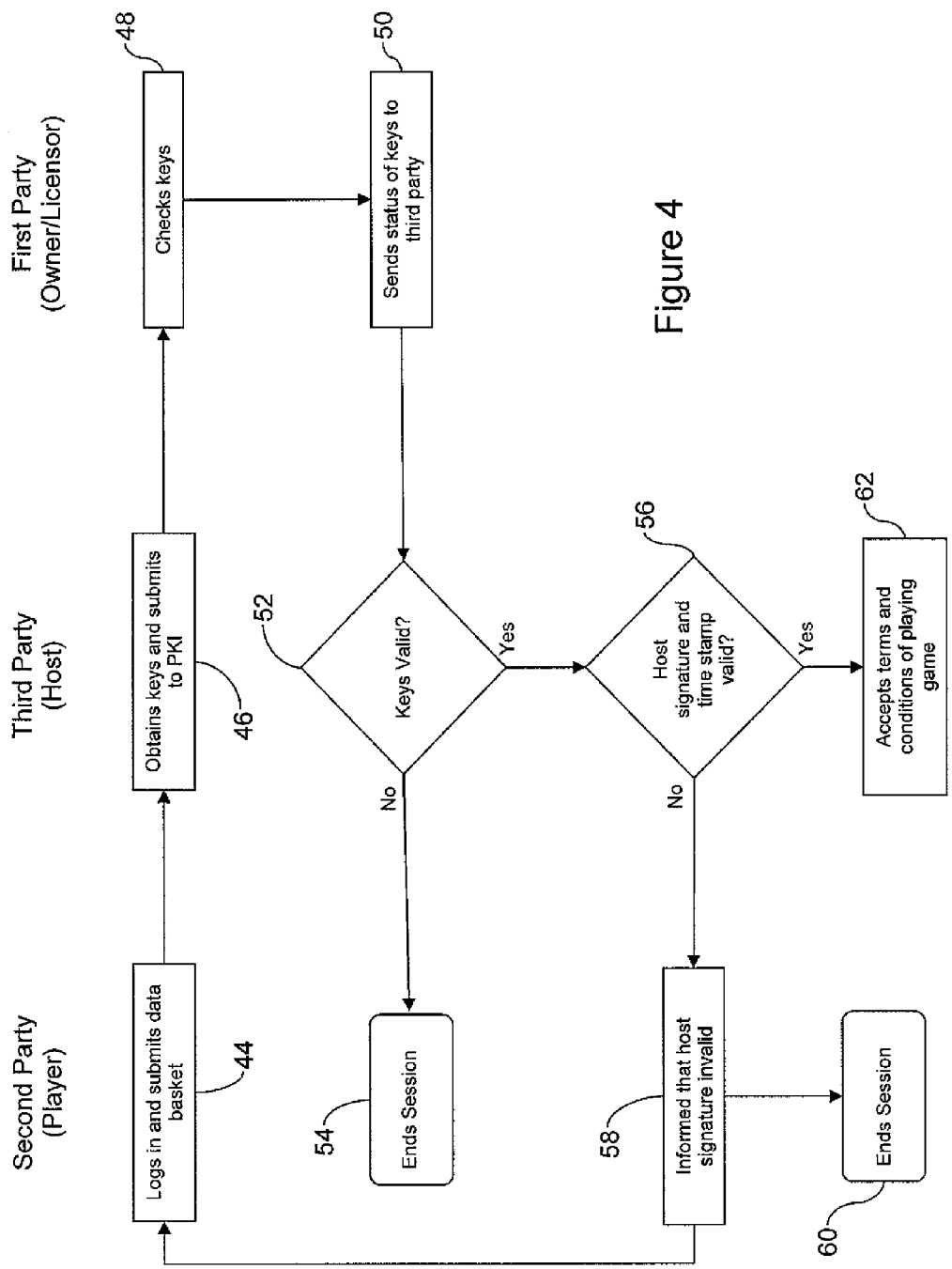
FIG. 4 is a schematic exemplifying the process in accordance with the preferred embodiment of the present invention by which the Second Party transports a set of data items to another game instance.

Referring now to FIG. 4, the process in accordance with the preferred embodiment of the present invention by which the Second Party, a player, transports a basket of game items to another authorized game instance hosted by the same or a different Third Party is shown. First, in step 44, the Second Party logs in to the Third Party's game and submits its basket of game items (the data set). Next, as shown in step 46, the Third Party retrieves the Second Party's and the previous Third Party public keys from the data set and submits them to the First Party's PKI for verification. In step 48, the First Party then verifies both the Second Party and the previous Third Party keys obtained from the data set and sends the status of the public keys to the current Third Party in 50. Next, in step 52, the Third Party checks the status of the Second Party's public key and, if it is invalid, the session is ended in 54. If the Second Party's key is valid, then in step 56 the Third Party checks the status of the previous Third Party key. If the previous Third Party key is invalid, the Second Party is informed that the host signature on its basket is invalid in step 58. The Second Party might be given the option to submit a different basket for approval (not shown) and start the process all over again or the Second Party could end the session as shown in step 60. If the Third Party signature on the basket is valid, the Second Party can proceed to play the game in 62 with the data that was submitted to the current Third Party.

So long as the basket is always moved between authorized instances of the game, the process remains fairly simple, but such is not always the case. Referring to FIGS. 2-4 in combination addresses the various scenarios involving the transfer of a game basket between authorized and unauthorized game instances. For example, one such scenario above was the movement of data from one authorized server to an unauthorized server. Referring to the Figures details the method in which the preferred embodiment of the present invention handles such situations and is now described in more detail.

A Second Party (player) which has obtained a basket of game items from an authorized instance of the game in 28 would log in to the unauthorized game instance hosted by the Third Party in 30. It is anticipated that an authorized Third Party could run an unauthorized instance of the game and therefore it cannot necessarily be said that each instance hosted by an authorized Third Party is an authorized instance. The Second Party would proceed to play the game just as it had on the authorized instance in 32. The Second Party could acquire and modify game items in the same manner as it had when playing on the authorized game instance in 34. At the conclusion of the session, the Second Party would sign the basket and submit it to the Third Party in 36. In this example, since the game instance was unauthorized, the signature and time stamp of the unauthorized Third Party would not be valid. Thus, when the Second Party later submits the invalidly signed and time stamped basket to an authorized game instance, the status of the Third Party's key will be determined to be "invalid" in step 58 and the Second Party will be forced to end the session in step 60 or start the process over again (not shown) presumably with a basket signed by an authorized Third Party.

FIGS. 3 and 4 exemplify this scenario in which a basket of game items is transported from an unauthorized game instance to an authorized game instance. In this scenario, the Second Party (player) would follow the process in FIG. 4, log in to the authorized Third Party game instance and submit the player basket with the unauthorized modifications to the Third Party in 44. The Third Party would submit the Second Party and Third Party keys obtained from the data in the basket to the PKI in 46 to determine whether the data is valid. The Third Party is then informed by the First Party of the status of the Second Party key and the Third Party key in step 50. Then, in step 52, the Second Party key would be checked and found to be valid. However, when the status of the Third Party key was checked in 56, it would be found to be invalid in 58 and the Second Party would be informed. The Third Party would not accept the basket that was submitted and the Second Party would have to submit another basket and start the process over in 44 or the session would be ended in step 60.

FIGS. 3 and 4 exemplify how the preferred embodiment of the present invention preferably handles yet another scenario in which a Second Party (player) moves a basket containing both authorized and unauthorized game items to an authorized instance of the game. As explained herein, a Second Party (player) may choose to play a game with an unauthorized Third Party (host). If a Second Party logs in on the unauthorized instance in 30, it may not be required to submit every game item in its basket to the Third Party. If that were the case, only those items submitted to the Third Party would be modified during game play. At the end of the session, when the Second Party signs and submits its basket to the Third Party in step 36, the unauthorized Third Party would only time stamp those specific items which had been used in the session in step 38. The unauthorized Third Party would not change the time stamp on the other items in the basket. The Third Party would then sign the basket and return it to the Second Party in 40. The Second Party could then follow the process depicted in FIG. 4, go to an authorized instance of the game and attempt to use the entire contents of its basket in step 44. The authorized Third Party would get all of the keys and submit them to the PKI managed by the First Party in 46.

Included in this submission would be the Second Party key, the key for each item in the basket and the key for the basket itself. The First Party would have the ability to check each key and determine if it was valid in step 48 and send the status of each key to the Third Party in 50. When the Third Party checked the status of the Second Party key in step 52, it would be valid. The Third Party would then check the status of the prior hosts' signature and time stamp on items in the basket in step 56. In this case, the Second Party would be informed that the key for the host who had most recently signed the basket was invalid in 58. However, the Second Party would also be informed that the key for certain of the items in the basket was valid and that those items could be used in the game in step 62. Depending upon which items were valid and which ones were invalid, the Second Party could decide to play the game with less than all of the items in the basket.

In an alternate embodiment of the present invention, the situation in which a Second Party (player) moves a basket of game items from one virtual world, game, or application (created by a First Party) to another virtual world, game, or application created by either a different or the same First Party is addressed. In this embodiment, the Second Party would follow the process depicted in FIG. 2 with two First Parties, First Party-A and First Party-B. First Party-A and First Party-B will have established an exchange or forwarding system between their respective PKIs, so that each First Party would be aware of the valid public keys issued by the other to Second Parties (players) and Third Parties (hosts). This type of inter-portability would require a degree of cooperation between First Party-A and First Party-B. Not only would there need to be a forwarding or information exchange system between PKIs, but there would also need to be a certain degree of compatibility between games and game items. The level of compatibility would be determined by the First Parties. For example, there could be certain "universal" game items, which could be transported between virtual worlds and other game items which would be specific to a particular virtual world. The two First Parties would also have to cooperate with respect to administrative matters, such as billing, etc.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method of verifying the source and authenticity of modified computer gaming data used within a computer gaming network, comprising:
    creating a computer game, wherein the game is created by a first computer gaming device having a processor, an input device and a display device;
    defining a data object that creates a data set for the game, wherein the data object is defined by the first computer gaming device;
    creating a set of rules for game play which permits the creation of valid, verifiable data objects by a second computer gaming device having a processor, an input device and a display device, wherein the set of rules are created by the first computer gaming device, and the first computer gaming device and the second computer gaming device interact via a communications network;
    establishing an authentication code system by the first computer gaming device to verify the relationship between the first computer gaming device and a second computer gaming device;
    establishing a valid authentication code for the first computer gaming device and the second computer gaming device, wherein the valid authentication code is established by the first computer gaming device in accordance with the authentication code system;
    modifying the data set by the second computer gaming device;
    signing the modified data set by the second computer gaming device using the authentication code established for the second computer gaming device;
    submitting the modified data set to the first computer gaming device for verification, wherein the modified data set is submitted by the second computer gaming device;
    determining by the first computer gaming device whether the second computer gaming device was authorized to modify the data set by verifying the authentication code used to sign the data set;
    signing the modified data set by the first computer gaming device using the authentication code established for the first computer gaming device; and
    allowing use of the modified data set by the first computer gaming device if the modified data set has been signed by the first computer gaming device and the second computer gaming device with a valid authentication code.

2. The method of claim 1, further comprising the step of:
    establishing an authentication code system utilizing a public key infrastructure and cryptographic signatures to verify the validity of the modified data set.

3. The method of claim 1, further comprising the step of:
    refusing transfer and use of the modified data set if the modified data set has not been signed with a valid authentication code.

4. The method of claim 1 wherein the data set contains online gaming data.

5. The method of claim 1, wherein the first computer gaming device is an online gaming server.

6. The method of claim 1, wherein the second computer gaming device is an online gaming user computer.

7. The method of claim 1, further comprising the step of:
    connecting a third computer gaming device in operative communication with the first computer gaming device and the second computer gaming device, wherein the third computer gaming device is an online gaming host server.

8. The method of claim 1, wherein the communications network is the Internet.

9. The method of claim 1, wherein a modified data set imported into the game is signed by the first computer gaming device and second computer gaming device with a valid authentication code.

10. The method of claim 1, further comprising the step of:
    importing modified data set from the second computer gaming device to the first computer gaming device, wherein the imported modified data set is validated by the first computer gaming device.

11. The method of claim 1, further comprising the step of:
    exporting a data set from the first computer gaming device to the second computer gaming device, wherein the data set is signed by the first computer gaming device and the second computer gaming device.

* * * * *